Sept. 6, 1938.　　　F. H. MANCHESTER　　　2,129,622

FLOORING MATERIAL AND METHOD FOR MAKING SAME

Filed Jan. 22, 1935

Inventor
Frank H. Manchester

By

Attorney

Patented Sept. 6, 1938

2,129,622

UNITED STATES PATENT OFFICE 2,129,622

FLOORING MATERIAL AND METHOD FOR MAKING SAME

Frank H. Manchester, Akron, Ohio, assignor to Wingfoot Corporation, Wilmington, Del., a corporation of Delaware Application January 22, 1935, Serial No. 2,854

12 Claims. (Cl. 154—2)

This invention relates to rubber flooring material and the method of producing the same. The flooring material comprises blocks of rubber flooring which are backed up with a resilient matrix composed of rubber and a cushioning material such as ground cork.

In making inlaid rubber flooring it has been found that if the various rubber blocks which comprise the surface are not of exactly the same thickness one of two serious defects results. (1) If the composition of the unvulcanized rubber is quite rigid, as is usually the case, the heavy gauge blocks take all the pressure and the light gauge blocks never meet the polished curing surface. This results in a rough, undervulcanized, defective surface on the light gauge blocks. (2) If the composition of the unvulcanized rubber is plastic the pressure during cure results in making the heavy gauge blocks flow or spread over in the low gauge areas resulting in uneven lines between the blocks.

According to this invention the various inlaid pieces are backed up with a cushioned matrix and pressure is applied to the surface of the inlaid pieces during cure to produce a perfectly even surface and the intended design is not deformed by any unintentional lateral flow of the individual pieces of inlay. The matrix is formed of rubber in which finely divided particles of resilient material such as cork, etc. are dispersed. The defects mentioned above are thus avoided because when the flooring is subjected to pressure for curing, the cork or other resilient material under the heavy gauge blocks is compressed and the low gauge blocks are brought into contact with the heated platen, plate or pan of the press and there is no appreciable lateral distortion of the heavy gauge pieces. The light gauge blocks are vulcanized in pressure contact with the smooth platen of the press and each block has a perfectly smooth surface. The rubber of the matrix is cured with the cork under compression so that when the pressure is released the inlaid blocks form a smooth surface.

Figure 1:
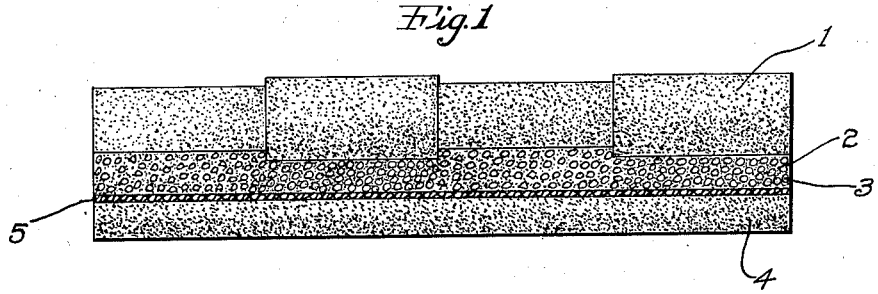
Figure 2:
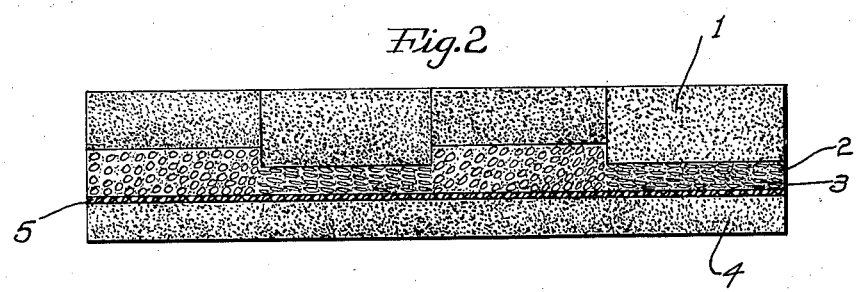
Figure 3:
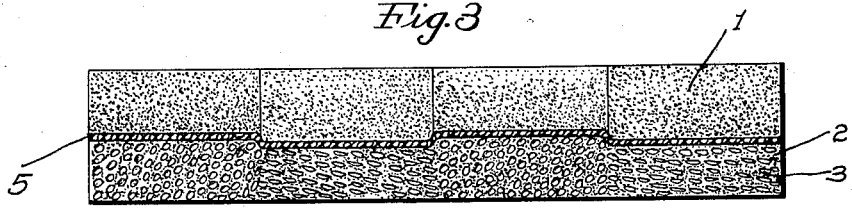

The invention will be further illustrated in connection with the accompanying drawing in which Fig. 1 shows rubber blocks of different thickness placed on a rubber matrix before vulcanization. Fig. 2 shows the same pieces of material after vulcanization. Fig. 3 shows a modified product.

In making the flooring the individual pieces of inlay 1 are fitted together on the matrix 2. In the preferred form of the invention this matrix is composed of rubber in which particles of cork 3 are substantially uniformly dispersed. When this is placed in the press and pressure is applied the compressible material under the heavy gauge blocks is compressed to a greater extent than the compressible material under the light gauge blocks so that the entire upper surface is brought into pressure contact with the upper plate of the press during the curing operation. This is indicated in Fig. 2. The matrix may be backed up with any suitable material such as a rubber base 4. It will often be advantageous to use fabric 5 between the matrix and the rubber base.

The structure shown in Figs. 1 and 2 is illustrative of the invention and it is not to be understood that the invention is limited to the structure shown. A modified flooring is shown in Fig. 3. It comprises fabric 5 interposed between the pieces of inlay and the matrix. Any suitable means of backing up the matrix may be employed.

It has been found that fine particles of cork are ordinarily denser and less compressible than coarser particles. Cork dust of 100 mesh has a gravity in rubber of about 1 and is not very compressible. Ground cork between 14–20 mesh has a gravity of about 0.30 in rubber and is quite compressible. It is not necessary to use cork of any particular particle size. A ground cork in which about 50% or more of the cork is not finer than 20 mesh will in general be found satisfactory. Instead of cork other volumetrically compressible materials such as ground sponge (sponge rubber), rubber scrap, ground or shredded Balsa wood, corn stalk pith and like porous materials may be used.

The invention is particularly valuable in preparing flooring from blocks of different colors which are prepared at different times and are therefore commonly of somewhat different thickness. The matrix may be made from any suitable rubber composition compatible in rate of vulcanization with the inlaid blocks and which will adhere to these blocks or to any intermediate layer of material such as the fabric shown in Fig. 3. The following formula for the rubber in a matrix comprising ground cork has been found to give satisfactory results:

| | Parts |
|---|---|
| Rubber | 100 |
| Mercaptobenzothiazyl disulfide | 1 |
| Sulfur | 3 |
| Sublimed litharge | 5 |
| Ground cork (14–20 mesh) | 100 |

I claim:

1. Flooring material with a smooth upper surface composed of rubber blocks of different thickness on a matrix composed of vulcanized rubber and a subdivided cushioning material, the cushioning material under thick blocks being compressed to a greater extent than cushioning material under thinner blocks.

2. Flooring material composed of adjoining rubber blocks of different thickness backed up with a matrix composed of vulcanized rubber and ground cork, characterized by the upper surface of the flooring material having a smooth surface produced by vulcanization in pressure contact with a smooth surface while the blocks are backed up by said matrix and further characterized by the fact that cork under the thicker blocks is compressed to a greater extent than cork under the thinner blocks.

3. Rubber flooring which comprises rubber blocks of different thickness on a matrix composed of vulcanized rubber and a subdivided cushioning material, characterized by (1) said rubber flooring having a perfectly smooth upper surface produced by vulcanization in pressure contact with a smooth surface and (2) cushioning material under blocks of different thickness being compressed to a different extent.

4. Rubber flooring comprising rubber flooring blocks of different thickness backed up with a matrix composed of vulcanized rubber and subdivided cushioning material, the cushioning material under blocks of different thickness being compressed different amounts to compensate for the difference in thickness in said blocks and being held in said compressed condition by the surrounding rubber in the matrix, said flooring being characterized by absence of lateral flow of the material composing the individual rubber blocks.

5. Rubber flooring material comprising rubber flooring blocks of different thickness backed up with a matrix composed of vulcanized rubber and a sub-divided cushioning material, the cushioning material under blocks of different thickness being compressed to a different extent and being held in this state by the surrounding vulcanized rubber, said flooring being characterized by the absence of lateral flow of the material composing the individual blocks and by a smooth upper surface produced by vulcanization in pressure contact with a smooth surface.

6. Rubber flooring which comprises adjoining rubber blocks of different thickness vulcanized to a matrix composed of rubber and ground cork, the upper surface of the flooring being a smooth surface, the matrix under blocks of different thickness being compressed to a different extent.

7. Rubber flooring which comprises blocks of rubber of different thickness backed up by a matrix composed of rubber and ground cork, said rubber flooring having a smooth upper surface produced by vulcanization in pressure contact with a smooth surface and being characterized by absence of lateral flow of the rubber blocks and by the cork under blocks of different thickness being compressed to a different extent.

8. The method of making flooring having a smooth upper surface which comprises forcing blocks of inlay of different thickness against a matrix of substantially uniform thickness composed of unvulcanized rubber and a subdivided cushioning material, by bringing the exposed surfaces of the blocks into pressure contact with a flat surface thereby compressing to different extents the cushioning material under blocks of different thickness, and vulcanizing the rubber of the matrix while thus holding the cushioning material under compression.

9. The method of making flooring which comprises pressing unvulcanized rubber blocks of different thickness onto a matrix of unvulcanized rubber and ground cork to bring the upper surface of each block into the same plane and into pressure contact with the smooth surface of the press used for vulcanization, and vulcanizing the upper surface of said blocks in pressure contact with said surface while vulcanizing the rubber of the matrix.

10. The method of making rubber flooring which comprises placing blocks of unvulcanized rubber of different thickness onto a matrix of uniform thickness composed of vulcanized rubber and subdivided cushioning material, bringing the exposed surfaces of the blocks into pressure contact with a flat plate of a vulcanization press, thereby compressing portions of the cushioning material under the thicker blocks to a greater extent than the portions under the thinner blocks and vulcanizing both the rubber blocks and the matrix while maintaining the cushioning material under pressure.

11. The method of making rubber flooring which comprises placing blocks of rubber of different thickness onto a matrix of rubber and a subdivided cushioning material, the upper surfaces of said blocks being in different planes, subjecting this assembly to sufficient vertical pressure to bring the surface of each rubber block into pressure contact with a flat plate of a vulcanization press without causing substantial lateral flow of any rubber block thereby compressing portions of the cushioning material to a greater extent than other portions and vulcanizing the exposed surface of the rubber blocks while in such pressure contact.

12. In the method of making rubber flooring from (1) blocks of rubber of different thicknesses, each block having a smooth upper surface and (2) a matrix composed of unvulcanized rubber and subdivided cushioning material, which blocks arranged on the matrix do not present a smooth flooring surface, the steps which comprise subjecting this assembly to sufficient vertical pressure in a vulcanization press to bring the surface of each rubber block into pressure contact with a flat plate of the vulcanization press thereby subjecting cushioning material under blocks of different thicknesses to different degrees of compression whereby the surface of each rubber block is brought into pressure contact with said flat plate of the vulcanization press without causing substantial lateral flow of any block, and vulcanizing the blocks and matrix while in such pressure contact.

FRANK H. MANCHESTER.